350-332 SR

1/30/79 XR 4,137,523

United States Patent [19]

[11] 4,137,523

[45] Jan. 30, 1979

Mukaiyama

[54] DIGITAL DISPLAY DRIVING CIRCUIT

[75] Inventor: Fumiaki Mukaiyama, Suwa, Japan

[73] Assignee: Kabushiki Kaisha Suwa Seikosha, Tokyo, Japan

[21] Appl. No.: 687,584

[22] Filed: May 19, 1976

[30] Foreign Application Priority Data

May 20, 1975 [JP] Japan ................................. 50-60575

[51] Int. Cl.[2] ................................. 361 58; G02F 1/13

[52] U.S. Cl. ................................. 340/813; 340/765; 350/332; 340/805

[58] Field of Search ............ 340/336, 339, 333, 248 P; 58/50 R; 361/58; 363/60; 350/332

[56] References Cited

U.S. PATENT DOCUMENTS

| | | | |
|---|---|---|---|
| 3,818,484 | 6/1974 | Nakamura et al. | 363/60 X |
| 3,821,627 | 6/1974 | Milovancevic | 363/60 |
| 3,873,888 | 3/1975 | Hanchett | 361/58 |
| 3,912,977 | 10/1975 | Fillmore | 58/50 R |

*Primary Examiner*—David L. Traeton

*Attorney, Agent, or Firm*—Blum, Moscovitz, Friedman & Kaplan

[57] ABSTRACT

An improved digital display driving circuit for driving digital display cells forming a ditigal display is provided. The driving circuit includes an interfacing circuit that in response to being energized receives a first data signal for selectively energizing certain of the display cells and a second drive signal for effecting AC driving of the display cells selectively energized by the data signal. The improved driving circuit is characterized by a DC supply coupled to the interfacing circuit, the AC supply being adapted to energize the interfacing circuit, and a detecting circuit coupled intermediate the DC supply and the interfacing circuit for selectively controlling the energizing of the interfacing circuit by the DC supply in response to the presence or absence of the drive signal being applied to the interfacing circuit to thereby prevent DC driving of the display cells.

6 Claims, 2 Drawing Figures

DIGITAL DISPLAY DRIVING CIRCUIT

BACKGROUND OF THE INVENTION

This invention is directed to an improved digital display driving circuit for driving digital display cells, and in particular, to a digital display driving circuit for only effecting AC driving of liquid crystal display cells in order to avoid deterioration thereof.

Due to the minimum current requirement of liquid crystal display cells, such display cells are particularly advantageous for use in miniaturized, battery-operated electronic measuring, testing and calculating instruments, such as pocket and desk type calculators and electronic wristwatches. Nevertheless, there are two characteristics of liquid crystals that must be taken into account, when utilizing same in battery-operated electronic instruments.

First, in order to avoid rapid deterioration of the liquid crystals, the liquid crystal display cells must be driven by an alternating current, hereinafter referred to as "AC drive". Specifically, the voltage across the respective electrodes defining the liquid crystal display cell must be energized in such manner as to reverse the potential across the liquid crystals during each successive energizing thereof. To this end, liquid crystal display driving circuits include interfacing circuits adapted to receive an AC driving signal and a data signal for selecting the display cells to be energized. However, if the AC driving signal ceases to be applied to the interfacing circuit, the selected liquid crystal display cells continue to be driven by the direct current applied to the interfacing circuit to energize same, thereby effecting a rapid deterioration of the liquid crystals.

Secondly, the voltage produced by the DC battery is insufficient to effect driving of liquid crystal display cells, thereby requiring a booster circuit for elevating the voltage applied to the display drive interface circuit. Usually, such booster circuits receive an AC signal produced by the same source utilized to generate the AC signal applied to the interface circuit to effect AC drive of the display cells. Because such AC signals are usually produced by an oscillator circuit energized by the DC supply, when the DC supply voltage begins to drop, an insufficient voltage is provided for effecting oscillation of the oscillator circuit producing the AC drive signals. Accordingly, the AC drive signals are no longer applied to the booster circuit and/or interface circuit, thereby causing the display cells to be driven by the unboosted direct current voltage produced by the DC supply. In such event, the contrast in the energized display cell is less than completely satisfactory and, as detailed above, the liquid crystals rapidly deteriorate. Accordingly, circuitry for preventing a DC drive current from being applied to the liquid crystal display cells is desired.

SUMMARY OF THE INVENTION

Generally speaking, in accordance with the invention, a digital display driving circuit for driving digital display cells forming a digital display is provided. The driving circuit includes an interfacing circuit adapted to be energized. The interfacing circuit in response to being energized receives a first data signal for selectively energizing certain of the display cells and a second driving signal for effecting an AC drive of the display cells selected by the data signal. A DC supply is coupled to the interfacing circuit for producing a voltage adapted to energize the interfacing circuit. A detecting circuit is coupled immediate the DC supply and the interfacing circuit, the detecting circuit being adapted to detect when the drive signal is applied to the interfacing circuit, and in response thereto apply the energizing voltage produced by the DC supply to the interfacing circuit, the detecting circuit being further adapted to detect when the drive signal is not applied to the interfacing circuit and in response thereto prevent the interfacing circuit from being energized by the DC supply voltage.

Additionally, the instant invention is characterized by the DC supply including a booster circuit, the booster circuit being adapted to receive a further drive signal and in response thereto elevate the energizing voltage applied to the interfacing circuit by the DC supply. The detecting circuit is further adapted to prevent the elevated energizing signal from being applied to the interfacing circuit in response to the further driving signal not being applied to the booster circuit.

Accordingly, it is an object of this invention to provide an improved digital display driving circuit for effecting only AC drive of the display cells.

A further object of the instant invention is to provide a liquid crystal display driving circuit for preventing deterioration of the liquid crystals by preventing DC driving thereof.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawing, in which.

DETAILED DESCRIPTION OF THE PREFERRED EMBODIMENT

Figure 1:
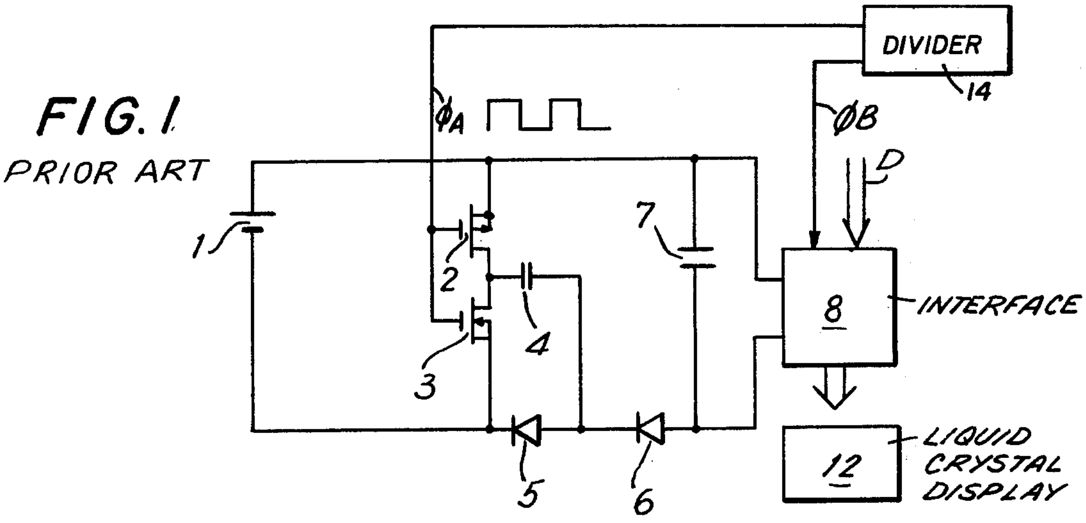
FIG. 1 PRIOR ART
FIG. 1 is a circuit diagram of a liquid crystal digital display driving circuit constructed in accordance with the prior art.

Reference is now made to FIG. 1, wherein a liquid crystal digital display driving circuit constructed in accordance with the prior art is depicted. An interfacing circuit 8 is adapted to drive a liquid crystal digital display. The liquid crystal digital display is formed in a conventional manner by disposing liquid crystals between spaced apart electrodes, each pair of spaced apart electrodes defining a distinct display cell. Each display cell defines a segment in a 7-segmented display digit. The interfacing circuit 8 includes decoder and driving circuitry, which circuitry in response to data signals D applied thereto selects the segement display cells in each digit to be energized. The interfacing circuit 8 further receives a first intermediate frequency AC drive signal $\phi_B$ having a frequency on the order of 32 Hz. A DC cell and/or battery is coupled to the interfacing circuit in order to apply a DC voltage to the interfacing circuit in order to permit same to effect decoding and driving of the liquid crystal display cells.

The AC drive signal $\phi_B$ is applied to the interfacing circuit in order to effect an AC drive of the liquid crystal display cells. Specifically, an AC drive refers to the driving of the liquid crystal display cells by rendering the liquid crystals between pairs of electrodes defining each display cell visually distinguishable from the remaining regions of liquid crystals forming the digital display by applying electric fields of sufficient strength and by reversing the orientation of the energizing fields during alternating drive cycles. Accordingly, by selecting the AC drive signal $\phi_B$ to be on the order of 30 to 35 Hz, the display cells are flickered at a sufficient rate so as not to be discerned by the human eye.

In miniaturized electronic measuring instruments, such as pocket sized calculators and electronic wristwatches, the effective voltage of the DC cell utilized to drive same is usually not sufficient to effect driving of liquid crystal display cells. Accordingly, a booster circuit is utilized to elevate the DC voltage produced by the DC cell. Referring to FIG. 1, a booster circuit is disposed intermediate the DC cell 1 and the interfacing circuit 8, and is controlled by a further intermediate frequency control signal $\phi_A$. Intermediate frequency control signal $\phi_A$ is produced by the same source as the AC drive signal $\phi_B$ but is of a higher frequency. If, for example, the digital display driving circuit depicted in FIG. 1 is utilized in an electronic wristwatch, the divider circuit 14 would be utilized as the source of the AC drive signal $\phi_B$ and the booster circuit control signal $\phi_A$.

The booster circuit control signal $\phi_A$ is applied to a pair of complementary coupled P-channel and N-channel MOS transistors 2 and 3. The P-channel MOS transistor 2 and the N-channel MOS transistor 3 have commonly coupled gate electrodes for receiving the booster circuit control signal $\phi_A$. The respective source terminals of the C-MOS transistors are coupled across the DC cell 1. The drain terminals of the C-MOS transistors are commonly coupled through a capacitor 4 and diode 5 to the negative side of the DC cell 1. A capacitor 7 defines the output of the booster circuit and is coupled to the source terminal of the P-MOS transistor 2 and through a diode 6 to a junction defined by diode 5 and capacitor 4.

The booster circuit is operated as follows. When the booster control signal $\phi_A$ is at a LOW level, the P-channel MOS transistor 2 is switched ON, and the N-channel MOS transistor 3 is switched OFF. Thus, during the LOW level half cycles of the booster control signal $\phi_A$ a closed current path with the DC cell 1 includes the positive electrode of the DC cell 1, the source-drain current path defined by P-channel MOS transistor 2; capacitor 4; diode 5; and the negative electrode of DC cell 1. Accordingly, during the LOW level half cycles of the control signal $\phi_A$, the capacitor 4 is charged to a potential opposite to the potential of the DC cell.

When the booster control signal $\phi_A$ is at a HIGH level, the P-channel MOS transistor 2 is turned OFF, and the N-channel MOS transistor 3 is turned ON thereby defining a closed current loop including: the positive electrode of the DC cell 1; capacitor 7; diode 6; capacitor 4; the drain-source current path defined by the N-MOS transistor 3 and the negative electrode of the DC cell 1. Accordingly, during the HIGH level half cycles of the booster control signal $\phi_A$, a voltage approaching twice that of the DC battery is generated across the capacitor 7 by the capacitor 4 and DC cell 1, thereby causing a boosted or elevated DC voltage to be applied to the interfacing circuit 8 to effect driving of same. It is noted that the capacitor 7 effects a smoothing of the DC voltage applied to the interfacing circuit.

When the source of the booster control signal $\phi_A$ stops oscillating, the MOS transistors are no longer switched, and the elevated voltage obtained by subtracting the voltage in the forwardly biased direction of the diodes from the battery voltage is generated at both ends of the capacitor 7. Moreover, if the AC drive signal $\phi_B$ also ceases to be applied to the interfacing circuit, the liquid crystal display is driven by the DC voltage produced by DC cell 1 thereby causing rapid deterioration of the liquid drystals.

As an example, when the liquid crystal display driving circuit is utilized in an electronic wristwatch, the oscillator circuit ceases to produce a time standard signal when the supply voltage produced by the DC cell drops to a voltage level of 1.2 V, thereby causing the booster control signal $\phi_A$ and the AC drive signal $\phi_B$ to cease being applied to the booster circuit and interfacing circuit respectively. Moreover, a supply voltage on the order of 0.8 V is applied to the liquid crystal display cell by the interfacing circuit, thereby causing the display cells to be hardly visually distinguishable and the liquid crystals to become rapidly deteriorated. In such an electronic wristwatch, the booster control signal $\phi_A$ would have a frequency of 256 Hz, and the AC drive signal $\phi_B$ would be $\frac{1}{8}$th that of the booster control signal $\phi_A$ or 32 Hz.

Accordingly, the prior art digital display driving circuits are characterized by a DC voltage being supplied to the liquid crystal display when the osciallator circuit malfunctions, or alternatively, the voltage level of the DC cell drops a sufficient amount to prevent oscillation of the oscillator circuit, thereby causing rapid deterioration of the liquid crystal display cells. Moreover, it is noted, that when the oscillator circuits malfunction, and there is no drop in the voltage level of the DC cell, an even higher DC voltage is applied to the DC cells, thereby further advancing the rate of deterioration of the liquid crystals.

Figure 2:
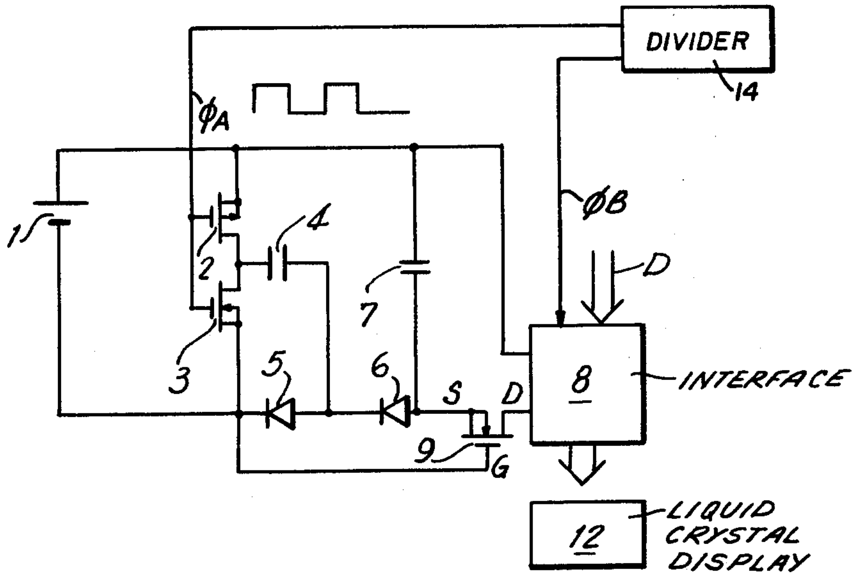
FIG. 2 is a circuit diagram of a liquid crystal digital display driving circuit constructed in accordance with a preferred embodiment of the instant invention.

Reference is now made to FIG. 2, wherein a liquid crystal digital display driving circuit constructed in accordance with the instant invention is depicted, like reference numerals being utilized to denote like elements depicted and described in FIG. 1. An enhancement type N-channel MOS transistor 9 is disposed intermediate the DC supply 1 and booster circuit and the interfacing circuit in order to prevent a DC voltage from being applied to the interfacing circuit in the absence of the booster control signal $\phi_A$ and the AC drive signal $\phi_B$ being applied to the booster circuit and interfacing circuit, respectively. Specifically, the gate electrode of the MOS transistor 9 is coupled to the junction defined by diode 5 and the source electrode of N-channel transistor 3. The source-drain electrodes of the MOS transistor 9 couple the junction between capacitor 7 and diode 6 to the interfacing circuit and accordingly, couple said junction to the interfacing circuit when the MOS transistor 9 is turned ON, and defines an open circuit therebetween when the MOS transistor 9 is turned OFF.

In operation, when the booster circuit is operated by the booster control signal $\phi_A$, the switching operation of the booster circuit references the gate electrode of the MOS transistor 9 to a sufficient voltage to turn same ON, and the elevated voltage produced by the booster circuit is applied to the interfacing circuit 8. Nevertheless, once the booster control signal $\phi_A$ is no longer applied to the booster circuit, the source electrode and gate electrode of N-channel MOS transistor 9 are referenced to the same potential, thereby switching the enhancement transistor 9 OFF. Accordingly, the switching OFF of the MOS transistor 9 thereby cuts off the DC voltage supplied to the interfacing circuit 8 and prevents the use of the DC voltage to drive the liquid crystal display cells. Moreover, due to the higher resistance between the source and drain terminals of the transistor 9 with respect to the resistance offered by the diodes 5 and 6, the effect of leakage currents caused by leakage between the source and drain can be ignored.

Accordingly, the instant invention is characterized by the MOS transistor 9 cutting off the supply of DC voltage to the interfacing circuit in response to detecting the absence of the booster control signal $\phi_A$ and/or the AC drive signal $\phi_B$ being applied to the booster circuit and interfacing circuit, respectively. Since such condition would only result from a malfunction of the circuitry producing the respective AC frequency signals, or alternatively, from a drop in the voltage level supplied by the DC cell, which drop would cause the circuitry producing such AC frequency signal from applying same to the booster and/or interfacing circuits, deterioration of the liquid crystals utilized in the liquid crystal display cells is prevented. For example, when a liquid crystal display is utilized in electronic wristwatches, and the electronic wristwatch stops working, due to the DC cell or battery utilized to energize same being exhausted, a failure to replace same immediately will not cause deterioration of the liquid crystals to occur.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In a digital display driving circuit for driving digital display cells forming a digital display, said driving circuit having interfacing circuit means adapted to be energized, and in response thereto receive a first data signal for selectively energizing certain of said display cells and a second driving signal produced by a signal source means and having a predetermined frequency for effecting an AC drive of said display cells selected by said data signals, the improvement comprising DC supply means for producing a voltage adapted to energize said interfacing circuit means, switching transistor detecting means coupled intermediate said DC supply means and said interfacing circuit means, said detecting means being adapted to detect when said drive signal is applied to said interfacing circuit means, and in response thereto apply said energizing voltage produced by said DC supply means to said interfacing circuit means, said detecting means being further adapted to detect when said drive signal is not being produced by said signal source means, and in response thereto, prevent said interfacing circuit means from being energized by said energizing voltage produced by said DC supply means, and booster circuit means intermediate said DC supply means and said detecting circuit means, said booster circuit means being adapted to receive a booster control signal produced by said signal source means and having a higher frequency than the predetermined frequency of said drive signal, and in response thereto elevate the energizing voltage produced by said DC supply means, said detection circuit means being coupled to said booster circuit means in order to detect the absence and presence of said booster control signal being produced by said signal source means, and in the absence of said booster control signal, prevent said elevated supply voltage from being applied to said interfacing circuit, said booster circuit means further including first and second transistor means adapted to receive said booster control signal, said first and second switching transistor means being alternately turned ON and OFF in response to said booster control signal being applied thereto, and first charging means coupled in parallel with said second transistor means, and second charging means coupled in parallel with said first transistor means and the parallel connection of said second transistor means and first charging means, said second charging means defining the output of said booster circuit means for applying said elevated supply voltage to said detecting circuit means, said first charging means being charged by said DC supply means in response to said first transistor means being turned ON, said second charging means being charged by said DC cell and said first charging means, in response to said second transistor means, being turned ON.

2. A digital display driving circuit as claimed in claim 1, wherein said detection circuit switching transistor means having a control electrode coupled to said booster circuit means to detect the presence of said booster control signal being applied to said booster circuit means, said detection transistor means including current path electrodes for defining a closed current path between said booster circuit means and said interface circuit means in response to said control electrode detecting the presence of said booster control signal being applied to said booster circuit means, said current path electrodes of said detection transistor means defining an open circuit between said booster circuit means and said interface circuit means in response to said control electrode detecting the absence of a booster control signal being applied to said booster circuit means.

3. A digital display driving circuit as claimed in claim 2, wherein said detection transistor means is an enhancement type MOS transistor, said gate electrode being coupled to said booster circuit means.

4. A digital display driving circuit as claimed in claim 3, wherein said enhancement type MOS transistor detection is a N-channel MOS transistor, the gate electrode of said N-channel detection transistor and the source electrode of said N-channel MOS transistor being coupled to respective reference points of said booster circuit so that said gate electrode and source electrode are referenced to the same potential when the booster control signal is not applied to said booster circuit means.

5. A digital display driving circuit as claimed in claim 2, wherein said first and second transistor means, in said booster circuit means, are P-channel and N-channel C-MOS transistors, respectively, said first charging means being a first charging capacitor coupled in parallel with said N-channel transistor, said second charging means being a second charging capacitor coupled in parallel with said P-channel transistor means and the parallel connection of said N-channel transistor means and first capacitor means, said second charging capacitor defining the output of said booster circuit means for applying said elevated supply voltage to said detecting circuit means.

6. A digital display driving circuit as claimed in claim 5, and including first diode means coupled intermediate said first charging capacitor and said N-channel transistor means, and a second diode means coupled intermediate said second charging capacitor and the parallel connection of said first diode means and first charging capacitor, said first and second diodes respectively cooperating with said first and second charging capacitors to define current paths therewith when said P-channel and N-channel transistors are alternately energized to thereby effect a boosting of booster control signal applied thereto.

* * * * *